United States Patent [19]

Gleim et al.

[11] Patent Number: 5,379,062
[45] Date of Patent: Jan. 3, 1995

[54] GRID CORRECTION DEVICE FOR A TELEVISION SET

[75] Inventors: Günter Gleim, Villingen; Jacques Chauvin, Mönchweiler, both of Germany

[73] Assignee: Deutsche Thomson-Brandt GmbH, Villengen-Schwenningen, Germany

[21] Appl. No.: 7,290

[22] Filed: Jan. 21, 1993

[30] Foreign Application Priority Data

May 25, 1990 [DE] Germany ............................ 4016886

[51] Int. Cl.$^6$ ..................... H04N 17/00; H04N 17/02; H04N 17/04
[52] U.S. Cl. .................................. 348/184; 348/180; 348/189
[58] Field of Search ............................ 358/10, 139, 56; 340/709, 706; H04N 17/00, 17/02, 17/04; 348/180, 184, 189, 190

[56] References Cited

U.S. PATENT DOCUMENTS

5,214,499 5/1993 Gleim et al. ............................ 358/10

FOREIGN PATENT DOCUMENTS

| | | | |
|---|---|---|---|
| 0069554 | 1/1983 | European Pat. Off. | H04N 7/02 |
| 0194944 | 3/1985 | European Pat. Off. | H04N 9/31 |
| 3931032 | 3/1991 | Germany | H04N 9/28 |
| 4109856 | 10/1992 | Germany | H04N 9/20 |
| 185482 | 12/1985 | Japan | H04N 9/28 |
| 9107058 | 6/1991 | WIPO | H04N 17/04 |

*Primary Examiner*—James J. Groody
*Assistant Examiner*—Glenton B. Burgess
*Attorney, Agent, or Firm*—Joseph S. Tripoli; Joseph J. Laks; Harvey D. Fried

[57] ABSTRACT

A method of collecting the spactial positions of crossing points of the lines in the grid on the visible portion of the screen of a television receiver used in different modes of operation includes the steps of storing a first set of correction values for each of the crossing points. The first correction values define the spactial positions of the correction points for all modes of operation of the television receiver. Additional correction values are stored for each mode of operation. The additional correction values are generated during an overscan period and during the scanning of an initialization line which is positioned outside the visible portion of the screen and compensate for displacement of the crossing points induced by tolerances in the tube. The first correction values and the additional correction values are simultaneously applied to the deflection current of the television tube while the visible portion of the screen is scanned.

2 Claims, 1 Drawing Sheet

GRID CORRECTION DEVICE FOR A TELEVISION SET

This is a continuation of PCT application PCT/EP 91/00926 filed May 17, 1991 by Gunter Gleim and titled "Grid Correction Device For A Television Set".

This invention is directed to the correction of crossing points on the screen of a color television receiver. It is known that such correction can be accomplished by defining the spatial position of the crossing points of horizontal and vertical lines in a lattice design on the screen. Correction values are determined for the crossing points and stored in memories. During the production of a picture the correction values are successively called up and along with the screen deflection signals are fed to the picture tube to correct the deflection parameters, in particular this technique is used to correct convergence errors.

In operating modes having differing vertical deflection amplitudes, so-called overscanning is used and the crossing points of the lattice design are displaced on the screen. Because a correction value is only valid for one particular spatial crossing point, separate memories are required for each of the individual operating modes. Therefore, it was suggested (application P 39 36 787) that in operating modes with different deflection amplitudes, the temporal position of each of the control pulses which generate the lines of the lattice design be so altered that the crossing points always lie at the same spatial positions in the picture area for different operating modes. The same memory with the same correction values can then be used for all operating modes.

It has become apparent that, depending on the respective operating mode and on the amplitude of the vertical deflection, tolerance induced deviations appear in the spatial positions of the picture elements on the screen. Consequently, the positions of the lattice design crossing points deviate from the desired positions, which are the same for all operating modes. The correction values used for the correction then no longer have the right values. It is an object of the invention to compensate for such tolerance induced deviations in the spatial positions of the crossing points for different operating modes.

The invention is based on the following consideration. The tolerance induced variations in the spatial positions of the crossing points are caused in particular by the electron beam getting into a region outside the visible picture area where the deflection is non-linear. The deviations in the spatial position of the crossing points on the visible picture surface are therefore caused by a more or less long pre-event history of the deviation at the start of the actual picture. With the invention these deviations are eliminated in that at the start of each picture, i.e. in the region of the upper edge of the picture, the stored correction value for the parameter is changed to another value, in the sense of a post-correction, during one line. That is, the total correction is carried out with a new correction value, and the same starting conditions are created at this spatial position for all operating modes. Accordingly, the deflection is set to its respective desired value independently of the pre-event history. In this way, the same starting positions are created at the start of the visible picture for all operating modes. Thus, compensation of the pre-event history, which is different depending on the respective operating modes, is carried out in the deflection before the start of the visible picture. The only expenditure required is that additional values are stored for one line for each operating mode. The correction effected by these values then guarantees that the crossing points appear at their desired spactial positions on the screen for all operating modes. A deviation during the visible picture area itself no longer occurs because the deflection within this region is to a large extent linear. Therefore, it is an achievement of the invention that the advantage of the same spatial position of the crossing points is retained and can be fully utilized for all operating modes with largely differing deflection amplitudes.

Figure 1:
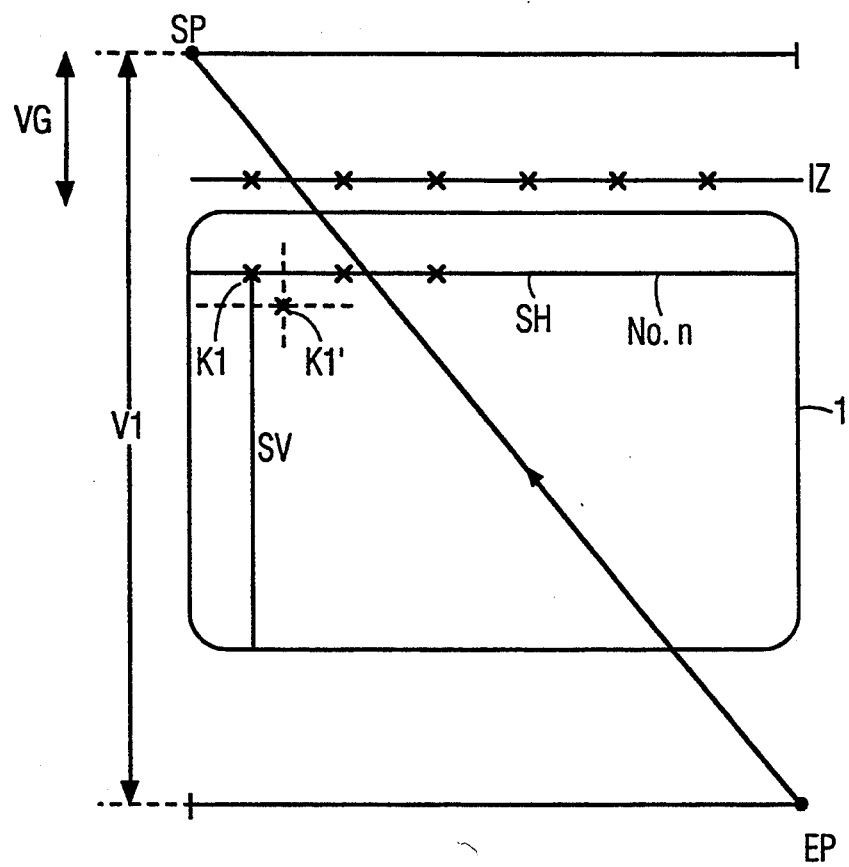
FIG. 1 shows a picture display area for displaying a television picture.
Figure 2:
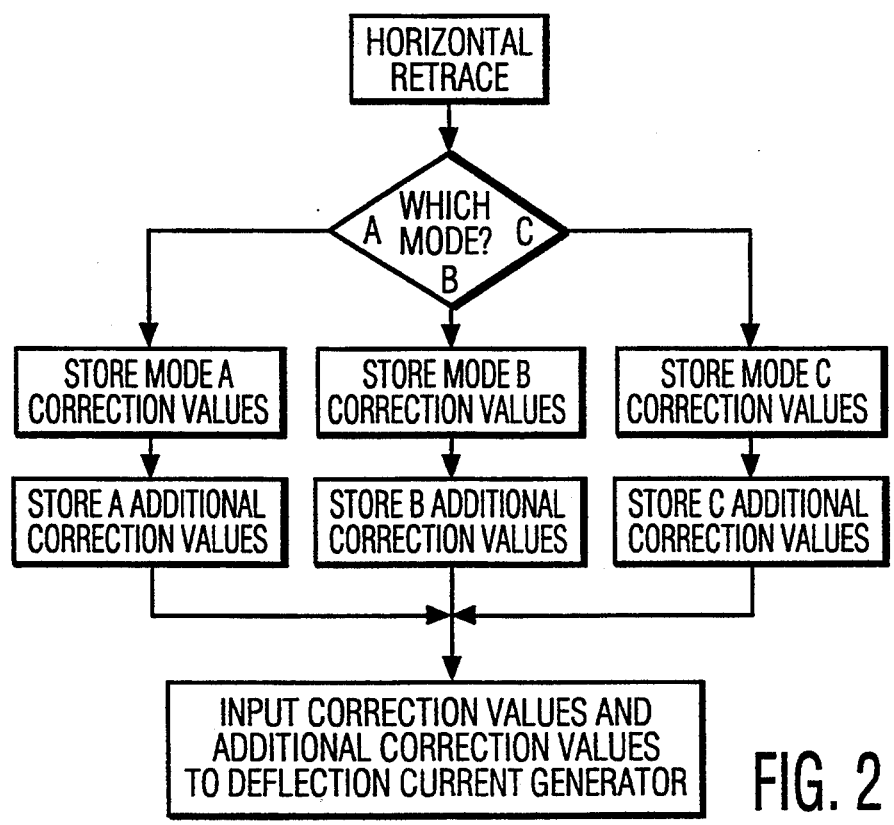
FIG. 2 is a flow chart of a preferred embodiment.

FIG. 1 shows the visible picture area 1 upon which a television picture is scanned. However, the deflection of the electron beam extends, in the sense of so-called overscanning, between the starting point SP and the finishing point EP. Such vertical deflection is used, for example, when a television signal having a wide band picture with black bars at the upper and lower picture edges is to be displayed without these black bars. By modifying the temporal position of the control pulses for the horizontal lines SH and the vertical lines SV of the lattice design the respective operating mode it is guaranteed that a certain gridline (n) always lies at the spatial position on the picture area 1 as shown and the crossing point K1 of horizontal line n and the vertical line SV should be at the spatial position shown in the FIGURE. However, because of tolerances, in particular non-linear deflection of the electron beam above the picture area 1, the crossing point K1 can be shifted to the position K1', as also shown in the FIGURE.

During the generation of the initialization line IZ in the proximity of the upper picture edge and shortly before the start of the viewable image, preferably during the scanning of the last line scanned before the first visible line is scanned, addition correction values are stored for each individual operating mode. The additional correction values have the effect of compensating for any deviations which are induced by tolerances and non-linear deflection between the starting point SP and the beginning of the scanning of the picture area 1 during the pre-event history VG of the deflection. Thus, the same starting conditions of the deflection are always available independently of this pre-event history. Accordingly, the crossing point K1 is located at the desired special position in the picture area 1. It is thus guaranteed that all crossing points K also are positioned at their desired spatial positions on the picture screen for the entire picture area 1 because the deflection during the scanning of picture area 1 is to a large extent linear.

We claim:

1. A method of correcting the spatial positions of crossing points of the lines in the grid on the visible portion of the screen of a television receiver used in different modes of operation comprising the steps:
   storing a first set of correction values for each of said crossing points, said first correction values defining the spatial positions of said crossing points for any of said modes of operation of said television receiver;
   storing an individual set of additional correction values for each of said modes of operation, said additional correction values being generated during an overscan period and during the scanning of an initialization line positioned outside the visible portion of the screen; and simultaneously applying said first correction values and said additional correction values to the deflection current of said television receiver while scanning said visible portion of said screen to compensate for deflection errors induced by tolerances.

2. The method of claim 1 wherein said initalization line is the last line scanned outside said visible portion.

* * * * *

UNITED STATES PATENT AND TRADEMARK OFFICE
CERTIFICATE OF CORRECTION

PATENT NO.   :   5,379,062
DATED        :   January 3, 1995
INVENTOR(S)  :   Gunter Gleim et al.

It is certified that error appears in the above-identified patent and that said Letters Patent is hereby corrected as shown below:

Title page, item [57], col. 2,
IN THE ABSTRACT:

Line 1, after "A method of", delete [collecting] and insert --correcting--

Signed and Sealed this

Ninth Day of April, 1996

Attest:

BRUCE LEHMAN

*Attesting Officer*   *Commissioner of Patents and Trademarks*